United States Patent
Liao et al.

(10) Patent No.: US 7,567,525 B2
(45) Date of Patent: *Jul. 28, 2009

(54) INTERACTIVE TWO-WAY TRANSFER MULTIMEDIA MESSAGING SERVICE METHOD

(75) Inventors: Sheng-Hsuan Liao, Taipei (TW); Meng-Ying Tsai, Taipei (TW)

(73) Assignee: Far EasTone Telecommunications Co., Ltd., Taipei (TW)

( * ) Notice: Subject to any disclaimer, the term of this patent is extended or adjusted under 35 U.S.C. 154(b) by 926 days.

This patent is subject to a terminal disclaimer.

(21) Appl. No.: 10/820,720

(22) Filed: Apr. 9, 2004

(65) Prior Publication Data

US 2004/0218735 A1 Nov. 4, 2004

(30) Foreign Application Priority Data

Apr. 11, 2003 (TW) ............................. 92108440 A

(51) Int. Cl.
*H04B 7/00* (2006.01)
(52) U.S. Cl. ................ 370/310; 370/230; 370/397; 370/389
(58) Field of Classification Search ............ 379/88.12, 379/88.13; 455/435, 556, 412.1, 3.04, 466
See application file for complete search history.

(56) References Cited

U.S. PATENT DOCUMENTS

| | | | |
|---|---|---|---|
| 6,640,086 B2 * | 10/2003 | Wall | 455/3.04 |
| 2002/0032752 A1 * | 3/2002 | Gold et al. | 709/218 |
| 2002/0194285 A1 * | 12/2002 | Mousseau et al. | 709/206 |
| 2003/0050062 A1 * | 3/2003 | Chen et al. | 455/435 |
| 2003/0054810 A1 * | 3/2003 | Chen et al. | 455/422 |
| 2003/0235278 A1 * | 12/2003 | Paila | 379/88.13 |

* cited by examiner

Primary Examiner—Curtis Kuntz
Assistant Examiner—Phung-Hoang J Nguyen
(74) Attorney, Agent, or Firm—Rosenberg, Klein & Lee

(57) ABSTRACT

The present invention provides an interactive two-way multimedia messaging service transfer method. A user sends a multimedia message to initiate the interactive 2-way transfer. A multimedia messaging service center sends the message to a multimedia messaging service dispatcher, so that the appropriate service provider is contacted according to the multimedia message. The digital multimedia content is obtained from the content service provider and a common service platform transforms the information into a multimedia message reply. Finally, the multimedia messaging service center sends the message to the user. The invention receives and transmits multimedia messages in order to provide the interactive two-way transmission system. In this way, mobile communication equipment users can access interactive content such as online games, anytime and anywhere.

5 Claims, 2 Drawing Sheets

INTERACTIVE TWO-WAY TRANSFER MULTIMEDIA MESSAGING SERVICE METHOD

BACKGROUND OF THE INVENTION

1. Field of the Invention

The present invention relates to multimedia messaging services. More specifically, the present invention discloses a method for interactive two-way multimedia message transfer and a series of interactive online transmissions using multimedia messaging services.

2. Description of the Prior Art

New models of mobile phones continue to be introduced into the market. Along with the completion of the next generation mobile phone standard, this has strengthened the growth of the wireless mobile data/web market.

With the introduction of Multimedia Messaging Service (MMS), which can transmit information such as images or data, the message transmission service industry has grown. In addition, the number of users or subscribers to the multimedia services has increased.

MMS is a standard of the $3^{rd}$ generation messaging services. It can not only send text messages, but also multimedia messages such as audio, graphics and image, etc. If the transmission speed permits, it can even transmit video clips.

However, the traditional Short Message Service (SMS) can only transmit short text or basic graphics. MMS can not only transmit a variety of information, but has also inherited the advantage of the previous generations; it can process MMS through different brands of mobile phones to other brands of mobile phones. That is to say, MMS users can send messages to any MMS users like their friends and family. MMS uses a multimedia messaging service center to transmit messages. It can transmit a large amount of information rapidly and stably, as well as confirm the messages were correctly sent to the destinations.

Similarly, due to the fast development of Internet, many types of interactive online games have been created. These allow multiple users to play virtual games online. However, these kinds of interactive games can only be played on a computer or laptop. At the same time, the mobile messaging of today can not provide online games. This can not satisfy user's needs.

Therefore, there is a need for an efficient method of interactive two-way transfers utilizing MMS which provides users with a way to access interactive content, such as games, through the MMS of mobile phones.

SUMMARY OF THE INVENTION

To achieve these and other advantages and in order to overcome the disadvantages of the conventional method in accordance with the purpose of the invention as embodied and broadly described herein, the present invention provides a method for interactive two-way multimedia message transfers and a series of interactive online transmissions using multimedia messaging services. The invention provides users with a way to access interactive content, such as games, through the MMS of mobile phones.

An object of the present invention is to provide a method of interactive 2-way transfers using Multimedia Message Service, which allows users to send and receive a series of continuous multimedia digital content or video information, in order to perform real time interactive 2-way transmission of online games or educational material. In this way, users can use mobile phones to play online games or participate in interactive learning, anytime and anywhere.

Another object of the present invention is to provide a method of interactive 2-way transfers using MMS without modifying or changing the structure of the mobile phone in order to offer real time online games or interactive learning using MMS.

Another object of the present invention is to provide a method of interactive 2-way transfers using MMS, to renew or update the multimedia messages sent by the user's mobile phone in order to record the game's progress or learning status.

Another object of the present invention is to provide a method of interactive 2-way transfers using Multimedia Message Service, to enhance the added value of a mobile phone by increasing the educational and entertainment functions of the mobile phone.

In order to achieve the objects mentioned above, the present invention provides a method for an MMS system that is in charge of receiving and transmitting multimedia messages, as well as transmitting and receiving multimedia messages to/from the user. A user sends a multimedia message to initiate the interactive two-way transfer. A multimedia messaging service center sends the message to a multimedia messaging service dispatcher, so that the appropriate service provider is contacted according to the multimedia message. The digital multimedia content is obtained from the content service provider and a common service platform transforms the information into a multimedia message reply. Finally, the multimedia messaging service center sends the message to the user.

Another application of the present invention uses the structure mentioned above to process the interactive 2-way transmission by sending multimedia messages.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
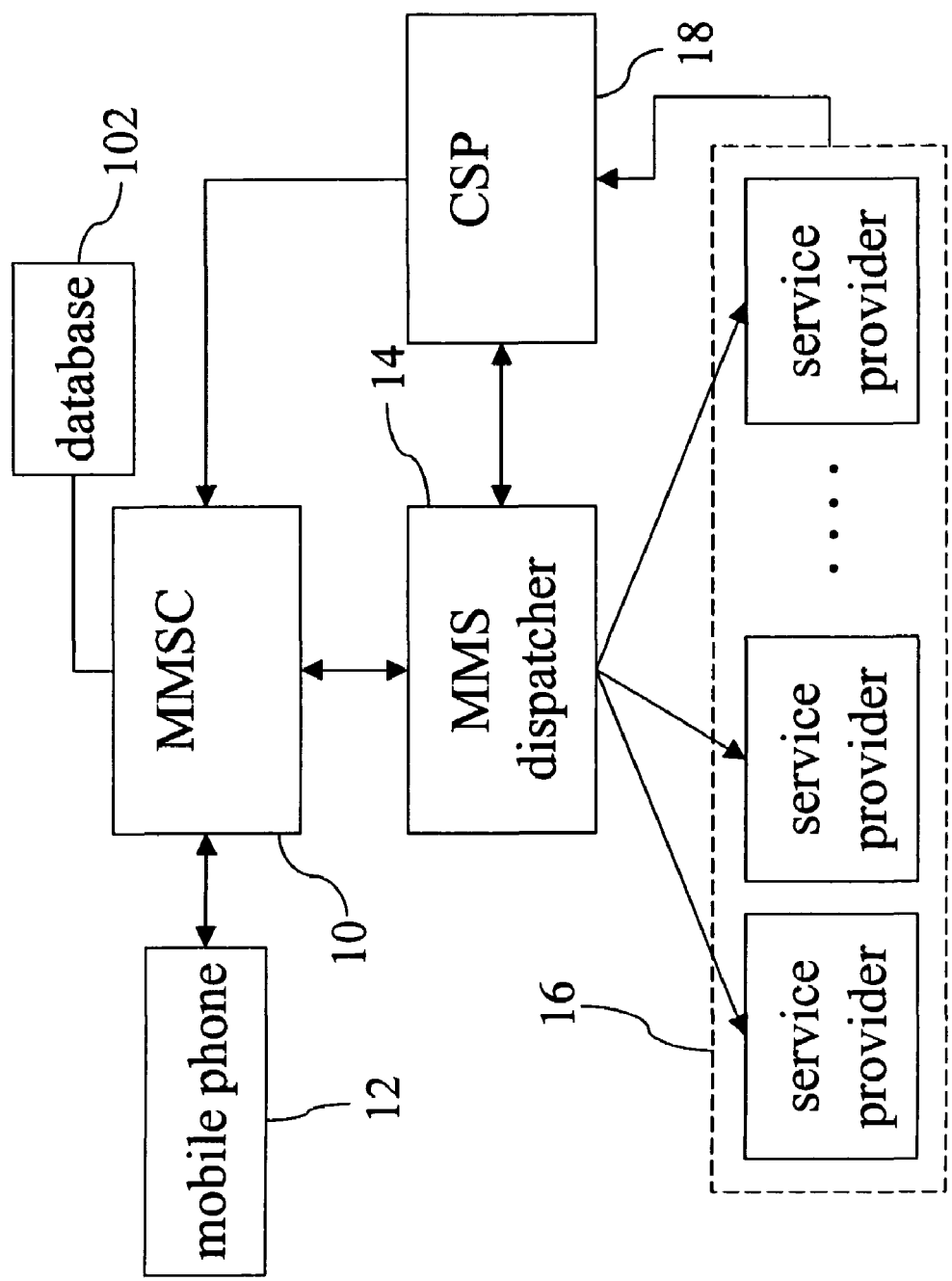
FIG. 1 is a block diagram illustrating the structure of the interactive 2-way transfer system according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

The present invention provides users with a way to use mobile phones directly in order to transmit and receive a series of multimedia messages, for example multimedia digital video, in order to process interactive 2-way transfers or transmissions of online games or learning material. In this way, mobile phone users can play online games or learn, anytime and anywhere.

Refer to FIG. 1, which is a block diagram illustrating the structure of the interactive 2-way transfer system according to an embodiment of the present invention.

As shown in FIG. 1, the structure of the interactive 2-way transfer system using Multimedia Message Service comprises a multimedia messaging service center (MMSC) 10, which is in charge of the transmission and reception of multimedia messages. Additionally, the MMSC 10 receives multimedia messages sent by a user's mobile phone 12. The multimedia message contains a transmission address and a service code. The MMSC 10 further comprises a database 102, containing a list or chart for service code lookup or investigation, the designated session and service information. The designated session and service information are obtained by using the service code transmitted by a mobile phone.

An MMS dispatcher 14 obtains the designated URL of the service according to the multimedia message containing session and service information sent by the MMSC 10. HTTP or XML is utilized in order to connect to the designated content service provider 16. The MMS dispatcher 14 can also connect to a plurality of content service providers 16. Different service providers supply different kinds of digital multimedia content.

A common service platform (CSP) 18 uses HTTP or XML to download and receive the multimedia content from the service provider 16. The CSP 18 then transforms the multimedia content into a multimedia message reply with the address of the sender as well as the multimedia content. Then, the CSP 18 sends the message to the MMSC 10. Finally, the MMSC 10 sends the multimedia message reply to the user's mobile phone 12.

If the user continuously performs the interactive 2-way transmission using MMS, the steps mentioned above are repeated continuously until the user stops sending the multimedia messages. In this way, the method of the present invention provides a means for playing real time interactive online games and learning through wireless communication equipment such as mobile phones.

Figure 2:
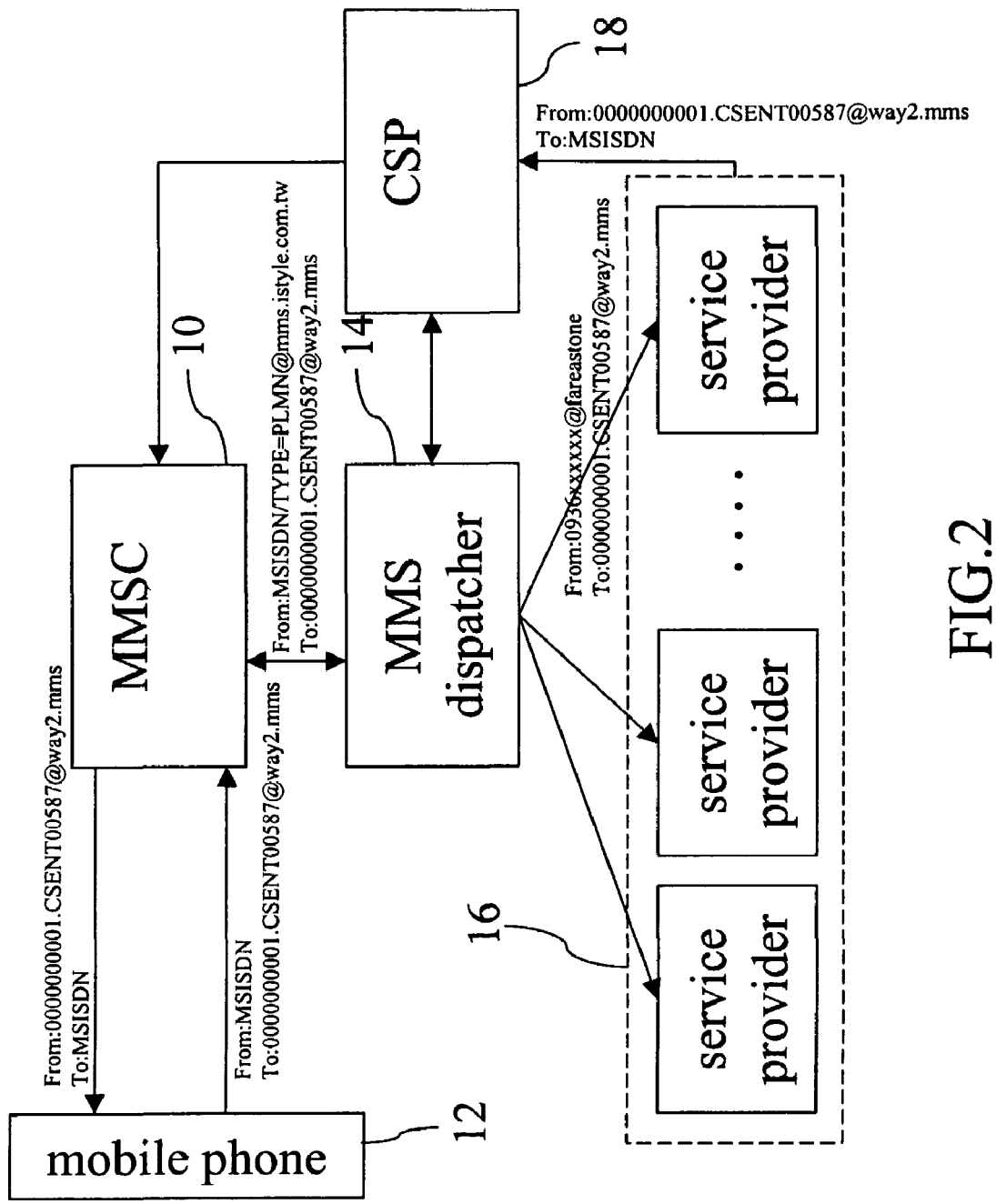
FIG. 2 is a diagram illustrating the processing of the interactive 2-way transfer system according to an embodiment of the present invention.

Refer to FIG. 2, which is a diagram illustrating the processing of the interactive 2-way transfer system according to an embodiment of the present invention.

Following is an example using online games. When the user starts to play a game on a mobile phone 12, the user first selects the desired game or the game level on the mobile phone 12. A multimedia message that includes the sender's address and the service code is sent to the MMSC 10. After the MMSC 10 obtains the desired game and service according to the multimedia message containing the service code, the MMSC 10 sends a message that includes the sender's address and session to a MMS dispatcher 14. According to the session information, the appropriate designated URL is obtained. Then the MMS dispatcher 14 sends the mobile phone number 12 and the message to the URL of the designated content service provider 16. The content service provider 16 sends the multimedia content that the user desires to a common service platform 18, which transforms the information into a multimedia message reply. Finally, the MMSC 10 to the user's mobile phone 12 sends the message. In this way, a user with a mobile phone 12 can send and receive multimedia messages and link a series of continuous multimedia messages, in order to achieve real time interactive 2-way transmission of online games, movies, or educational material.

Additionally, under the principle of not altering, modifying, or changing the mobile phone or mobile phone standard, MMS can be directly utilized to process real time interactive games or learning. Since each piece of sent information has an embedded code, the information of each level can be recorded and followed. The multimedia messages can be renewed or updated according to the sent messages from the mobile phone, in order to follow the progress and stages of the game.

In a similar way, educational material can be presented to the user and the progress of the student can be followed. For example, which lessons have been completed, test scores, etc. can all be stored so that continuous status is maintained.

Additionally, movies may be split into small scenes and which scenes have been watched can be followed.

Basically, the structure and method of interactive 2-way transfers using multimedia messaging services of the present invention provided real time interaction and 2-way transmission. In doing so, the educational and entertainment functions of the mobile phone are enhanced, as well as increasing the added value of the mobile phone.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. An interactive 2-way transfer multimedia messaging service method comprising:

sending at least one multimedia message, by a user, using a mobile phone to send the at least one multimedia message, the at least one multimedia message sent by the user including a user's address and a service code;

receiving the at least one multimedia message by a multimedia messaging service center and sending the at least one multimedia message to a multimedia messaging service dispatcher;

obtaining an address of a service provider, by the multimedia messaging service dispatcher, according to the at least one multimedia message, contacting the service provider, and obtaining multimedia content from the service provider; wherein the step of contacting the service provider is performed using eXtensible Markup Language (XML) and the step of obtaining the multimedia content from the service provider and sending the reply to the user is performed using XML;

transforming the multimedia content into at least one multimedia message reply, by a common service platform, and sending the reply to the user via the multimedia messaging service center; and the steps are repeated continuously until the user stops sending the at least one multimedia message.

2. An interactive 2-way transfer multimedia messaging service method comprising:

sending at least one multimedia message, by a user, using a mobile phone to send the at least one multimedia message, the at least one multimedia message sent by the user including a user's address and a service code;

receiving the at least one multimedia message by a multimedia messaging service center and sending the at least one multimedia message to a multimedia messaging service dispatcher, the multimedia messaging service center obtaining at least one session and service datum according to the service code and the multimedia messaging service center including a database with a reference list corresponding to the at least one session and service datum;

obtaining an address of a service provider, by the multimedia messaging service dispatcher, according to the at least one multimedia message, contacting the service provider, and obtaining multimedia content from the service provider; wherein the step of contacting the service provider is performed using eXtensible Markup Language (XML); and transforming the multimedia content into at least one multimedia message reply, by a common service platform, and sending the reply to the user via the multimedia messaging service center;

wherein the step of obtaining the multimedia content from the service provider and sending the reply to the user is performed using XML.

3. The interactive 2-way transfer multimedia messaging service method of claim 2, whereby the multimedia messaging service dispatcher obtains a Uniform Resource Locator (URL) corresponding to the at least one multimedia message, containing the at least one session and service datum sent by the multimedia messaging service center and then connects to the service provider corresponding to the URL.

4. The interactive 2-way transfer multimedia messaging service method of claim 1, whereby the multimedia messaging service dispatcher uses Hypertext Transfer Protocol (HTTP) to connect to the service provider.

5. An interactive 2-way transfer multimedia messaging service method comprising:

sending at least one multimedia message, by a user, using a mobile phone to send the at least one multimedia message, the at least one multimedia message sent by the user including a user's address and a service code;

receiving the at least one multimedia message by a multimedia messaging service center and sending the at least one multimedia message to a multimedia messaging service dispatcher;

obtaining an address of a service provider, by the multimedia messaging service dispatcher, according to the at least one multimedia message, contacting the service provider, and obtaining multimedia content from the service provider; wherein the step of contacting the service provider is performed using eXtensible Markup Language (XML); and transforming the multimedia content into at least one multimedia message reply, by a common service platform, and sending the reply to the user via the multimedia messaging service center, the common service platform sending the at least one multimedia message reply comprising a user's address and the multimedia content, to the user via the multimedia messaging service center;

wherein the step of obtaining the multimedia content from the service provider and sending the reply to the user is performed using XML and, wherein the common service platform and the service provider use HTTP to transmit the multimedia content and the at least one multimedia message reply to the user.

* * * * *